United States Patent
Tzeng

(10) Patent No.: US 6,340,146 B1
(45) Date of Patent: Jan. 22, 2002

(54) CEILING LCD MOUNTING STRUCTURE

(75) Inventor: A-Shui Tzeng, Pan Chiao (TW)

(73) Assignee: Proton Electronic Industrial Co., Ltd., Pan Chiao (TW)

( * ) Notice: Subject to any disclaimer, the term of this patent is extended or adjusted under 35 U.S.C. 154(b) by 0 days.

(21) Appl. No.: 09/628,431

(22) Filed: Jul. 28, 2000

(51) Int. Cl.⁷ .............................. A47H 1/10
(52) U.S. Cl. .................. 248/317; 248/291.1; 248/919; 361/725; 307/9.1; 16/270
(58) Field of Search .................. 248/291.1, 919, 248/917, 922, 923, 317; 361/725, 726, 727; 307/9.1, 10.1; 16/270

(56) References Cited

U.S. PATENT DOCUMENTS

| | | | | |
|---|---|---|---|---|
| 4,983,951 A | * | 1/1991 | Portman | 312/7.2 |
| 5,173,686 A | * | 12/1992 | Fujihara | 340/700 |
| 5,335,076 A | * | 8/1994 | Reh | 348/794 |
| 5,467,106 A | * | 11/1995 | Salomon | 345/87 |
| 6,157,418 A | * | 12/2000 | Rosen | 348/837 |
| 6,181,387 B1 | * | 1/2001 | Rosen | 248/837 |
| 6,186,459 B1 | * | 2/2001 | Ma | 248/276.1 |
| D438,850 S | * | 3/2001 | Rosen | D14/132 |
| 6,199,810 B1 | * | 3/2001 | Wu et al. | 248/291.1 |
| 6,246,449 B1 | * | 6/2001 | Rosen | 348/837 |

FOREIGN PATENT DOCUMENTS

JP 124635 A * 4/2000

* cited by examiner

Primary Examiner—Anita King
Assistant Examiner—Kimberly Wood
(74) Attorney, Agent, or Firm—Bacon & Thomas, PLLC

(57) ABSTRACT

A ceiling LCD mounting structure includes a mounting base fixedly fastened to the ceiling of a car, the mounting base defining a bottom receiving chamber, a pivot shaft coupled between two clamping plates in a top side of the mounting base and held down by at least one holding down plate and adapted to be rotated relative to the clamping plates, and a LCD holder frame holding a LCD (liquid crystal display), the LCD holder frame having mounting flange inserted through an opening in the mounting base and fastened to the pivot shaft for enabling the LCD holder frame to be turned in and out of a bottom receiving chamber of the mounting base and positioned in one of a series of angular positions.

6 Claims, 3 Drawing Sheets

CEILING LCD MOUNTING STRUCTURE

BACKGROUND OF THE INVENTION

The present invention relates to a ceiling LCD mounting structure, which enables a LCD (liquid crystal display) to be installed in the ceiling of a car, and positioned in one of a series of angular positions.

A car may be equipped with an electronic system having a LCD. When an electronic system having a LCD is installed in a car, the user cannot adjust the angular position of the LCD to the desired view angle.

SUMMARY OF THE INVENTION

It is the main object of the present invention to provide a ceiling LCD mounting structure, which holds a LCD in the ceiling of a car, enabling the LCD to be adjusted to one of a series of angular positions. According to one aspect of the present invention, the ceiling LCD mounting structure comprises a mounting base fixedly fastened to the ceiling of a car, the mounting base defining a bottom receiving chamber, a pivot shaft coupled between two clamping plates in a top side of the mounting base and held down by at least one holding down plate and adapted to be rotated relative to the clamping plates, and a LCD holder frame holding a LCD (liquid crystal display), the LCD holder frame having mounting flange inserted through an opening in the mounting base and fastened to the pivot shaft for enabling the LCD holder frame to be turned in and out of a bottom receiving chamber of the mounting base. According to another aspect of the present invention, the clamping plates each comprise a substantially U-shaped clamping arm clamped on the pivot shaft, the U-shaped clamping arm comprising two vertically spaced and transversely extended positioning grooves for holding the pivot shaft in one of a series of angular positions, and the pivot shaft comprises a plurality of longitudinal positioning ribs symmetrically disposed around two distal ends thereof for engagement with the positioning grooves in the U-shaped clamping arms of the clamping plates to hold the pivot shaft in one of a series of angular positions.

DETAILED DESCRIPTION OF THE PREFERRED EMBODIMENT

Referring to FIGS. from 1 through 3, a ceiling LCD mounting structure is shown comprised of a mounting unit 1, and a LCD (liquid crystal display) 40 mounted in the mounting unit 1. The mounting unit 1 is installed in the ceiling of a car, and allows the user to adjust the LCD 40 to the desired angle.

Figure 1:
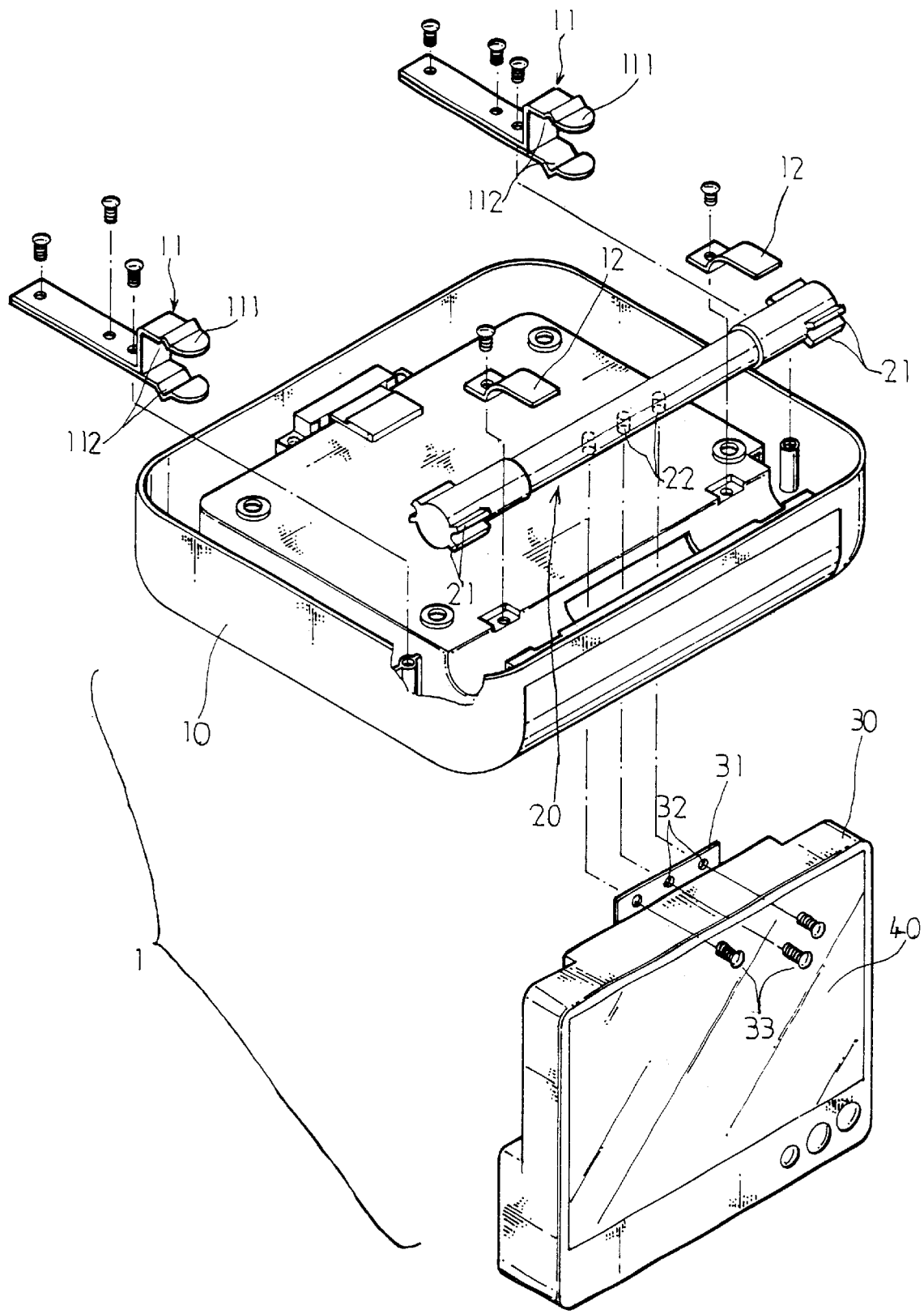
FIG. 1 is an exploded view of a ceiling LCD mounting structure according to the present invention.
Figure 2:
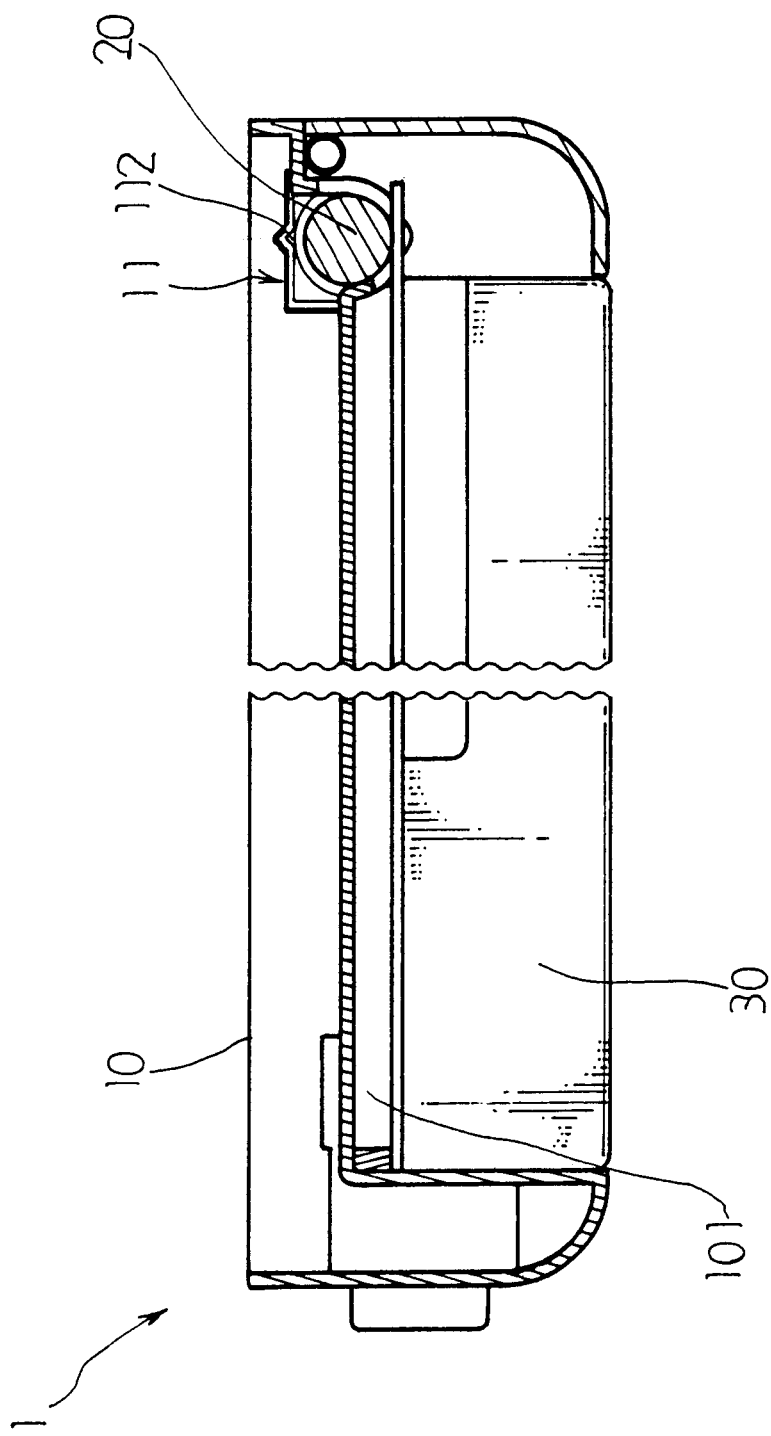
FIG. 2 is a sectional assembly view of the ceiling LCD mounting structure according to the present invention.

The mounting unit 1 comprises a mounting base 10, two clamping plates 11, a plurality of holding down plates 12, a pivot shaft 20, and a LCD holder frame 30. The mounting base 10 comprises a bottom receiving chamber 101 (see FIG. 2) adapted to receive the LCD holder frame 30. The clamping plates 12 are bilaterally mounted in the top side wall of the mounting base 10, each having a substantially U-shaped clamping arm 111. The U-shaped clamping arm 111 comprises two vertically spaced and transversely extended positioning grooves 112. The pivot shaft 20 is rotatably mounted in the top side wall of the mounting base 10 and coupled between the U-shaped clamping arms 111 of the clamping plates 11, having a plurality of longitudinal positioning ribs 21 symmetrically disposed around two distal ends thereof for engagement with the positioning grooves 112 in the U-shaped clamping arms 111 of the clamping plates 11 to hold the pivot shaft in one of a series of angular positions, and a plurality of mounting holes 22 spaced between the longitudinal positioning ribs 21. The holding down plates 12 are fixedly mounted on the top side wall of the mounting base 10, each having a Z-shaped profile with one end, namely, the fixed end fixed end fixedly fastened to the top side wall of the mounting base 10 and the other end, namely, the free end pressed on the pivot shaft 20. The LCD holder frame 30 holds the LCD 40 on the inside, comprising a top mounting flange 31. The top mounting flange 31 is inserted through an opening through the top side wall of the mounting base 10, having a plurality of mounting holes 32 respectively fastened to the mounting holes 22 on the pivot shaft 20 by respective screws 33.

Figure 3:
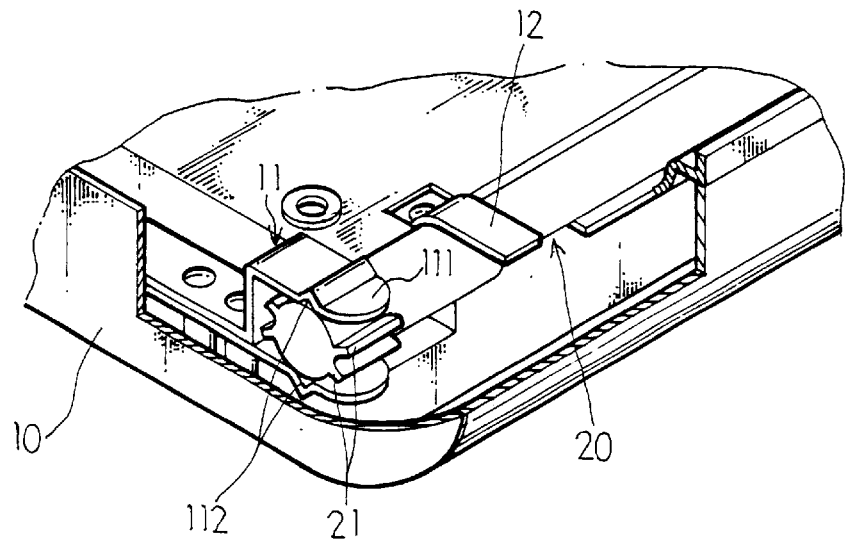
FIG. 3 is a cutaway view of a part of the present invention, showing the positioning of the pivot shaft in the mounting base.
Figure 4:
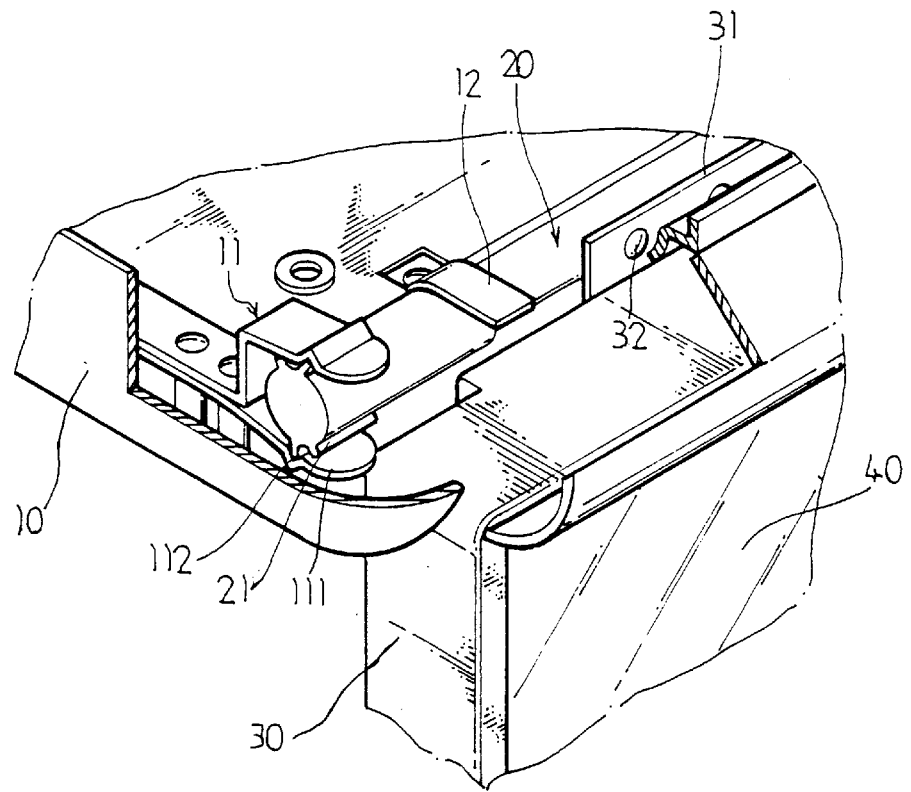
FIG. 4 is a cutaway view of a part of the present invention, showing the LCD holder frame turned out of the bottom receiving chamber of the mounting base.

Referring to FIG. 4 and FIG. 3 again, when in use, the mounting base 10 is fixedly installed in the ceiling of the car with the top side wall of the mounting base 10 facing the ceiling of the car, and then the LCD 40 is installed in the LCD holder frame 30. After installation, the pivot shaft 20 can be turned with the LCD holder frame 30 relative to the U-shaped clamping arms 111 of the clamping plates 11 to the desired angle.

While only one embodiment of the present invention has been shown and described, it will be understood that various modifications and changes could be made thereunto without departing from the spirit and scope of the invention disclosed.

What the invention claimed is:

1. A ceiling LCD mounting structure comprising:

a mounting base fixedly fastened to the ceiling of a car, said mounting base comprising a bottom receiving chamber defined in a bottom side wall thereof, two clamping plates fixedly mounted in a top side wall thereof, and at least one holding down plate;

a pivot shaft coupled between said clamping plates and held down by said at least one holding down plate and adapted to be rotated relative to said clamping plates and positioned in one of a series of angles; and a LCD holder frame holding a LCD (liquid crystal display), said LCD holder frame having mounting means fastened to said pivot shaft for enabling said LCD holder frame to be turned in and out of said bottom receiving chamber of said mounting base.

2. The ceiling LCD mounting structure of claim 1 wherein said clamping plates each have a substantially U-shaped clamping arm clamped on said pivot shaft, said U-shaped clamping arm comprising two vertically spaced and transversely extended positioning grooves for holding said pivot shaft in one of a series of angular positions.

3. The ceiling LCD mounting structure of claim 2 wherein said pivot shaft comprises a plurality of longitudinal positioning ribs symmetrically disposed around two distal ends thereof for engagement with the positioning grooves in the U-shaped clamping arms of said clamping plates to hold said pivot shaft in one of said series of angular positions.

4. The ceiling LCD mounting structure of claim 1 wherein said at least one holding down plate each has a Z-shaped profile.

5. The ceiling LCD mounting structure of claim 1 wherein said pivot shaft comprises a plurality of mounting holes for the mounting of the mounting means of said LCD holder frame.

6. The ceiling LCD mounting structure of claim 5 wherein the mounting means of said LCD holder frame comprises a top mounting flange inserted through an opening in said mounting base, said mounting flange having a plurality of mounting holes respectively fastened to the mounting holes on said pivot shaft by screws.

* * * * *

UNITED STATES PATENT AND TRADEMARK OFFICE
CERTIFICATE OF CORRECTION

PATENT NO.    : 6,340,146 B1
DATED         : January 22, 2002
INVENTOR(S)   : Tzeng It is certified that error appears in the above-identified patent and that said Letters Patent is hereby corrected as shown below:

<u>Title page,</u>
Item [*] Notice, delete the phrase "by 0 days" and insert -- by 5 days --

Signed and Sealed this

Eighteenth Day of May, 2004

JON W. DUDAS
*Acting Director of the United States Patent and Trademark Office*